(12) United States Patent
Feller

(10) Patent No.: US 6,992,624 B2
(45) Date of Patent: Jan. 31, 2006

(54) ATTITUDE DETERMINATION SYSTEM USING NULL-STEERED ARRAY

(75) Inventor: Walter J. Feller, Airdrie (CA)

(73) Assignee: Novatel Inc., Calgary (CA)

( * ) Notice: Subject to any disclaimer, the term of this patent is extended or adjusted under 35 U.S.C. 154(b) by 0 days.

(21) Appl. No.: 10/873,806

(22) Filed: Jun. 22, 2004

(65) Prior Publication Data

US 2005/0280577 A1 Dec. 22, 2005

(51) Int. Cl.
*G01S 5/04* (2006.01)
(52) U.S. Cl. .................. 342/432; 342/357.11; 342/462
(58) Field of Classification Search .......... 342/357.06, 342/357.11, 432, 442, 445, 462; 701/207, 701/213
See application file for complete search history.

(56) References Cited

U.S. PATENT DOCUMENTS

| | | | |
|---|---|---|---|
| 5,323,322 A | | 6/1994 | Mueller et al. |
| 5,940,026 A | * | 8/1999 | Popeck .................. 342/357.01 |
| 5,995,044 A | | 11/1999 | Kunysz et al. |
| 6,018,315 A | | 1/2000 | Ince et al. |
| 6,128,557 A | | 10/2000 | Fenton et al. |
| 6,445,354 B1 | | 9/2002 | Kunysz |
| 6,452,543 B1 | | 9/2002 | Tseng et al. |
| 6,452,560 B2 | | 9/2002 | Kunysz |
| 6,459,406 B1 | | 10/2002 | Tseng et al. |
| 6,466,177 B1 | | 10/2002 | Kunysz |
| 6,598,009 B2 | * | 7/2003 | Yang .......................... 702/152 |
| 6,816,117 B2 | * | 11/2004 | Fink et al. .................. 342/464 |

* cited by examiner

*Primary Examiner*—Dao Phan
(74) *Attorney, Agent, or Firm*—Edwin H. Paul, Esq.; Cesari and McKenna, LLP

(57) ABSTRACT

Apparatus and process for determining the position and heading or attitude of an antenna array are described based on radiating sources, preferably GNSS or other such satellite positioning systems. An optimum satellite is selected and the antenna array is "null steered" by combining the phase of the received signals to calculate a null or null angle that points toward the optimum satellite. The null will determine angle for elevation toward the optimum satellite and azimuth or heading. The heading is the azimuth of the (which may be actual or calculated) projection of the null vector to the satellite onto the Earth's surface. The actual location on Earth of the antenna array can be found and the antenna array azimuth with respect to the satellite can be determined. The null angle may be measured more precisely by dithering on either side to average out noise and then averaging the angle deviations to calculate the null angle. If the attitude of the antenna array with respect to the Earth's surface is desired, a null vector to a second satellite may be generated and the intersection of the two nulls will allow the attitude of the antenna array, with respect to one or both of the satellites, to be determined. The difference between the measured attitude of the antenna array with respect to the null vector and the calculated attitude of the satellite from the GNSS signals, is the attitude of the array with respect to the Earth's surface. All viewable satellites may be used, tracked, and nulls determined for each, and many antennas if in a known pattern relative to each other can be used to make the determinations more accurate and reliable.

20 Claims, 4 Drawing Sheets

ATTITUDE DETERMINATION SYSTEM USING NULL-STEERED ARRAY

BACKGROUND OF THE INVENTION

1. Field of the Invention

The present invention relates to determining navigation heading or attitude using a satellite based positioning system and antenna array.

2. Background Information

Commonly used attitude determination apparatus and methods include use of geomagnetic sensors, gyroscopic sensors or phase differences of signals received from multiple satellites of the Global Navigation Satellite System (GNSS) or other similar systems.

Geo-magnetic sensors are susceptible to errors from locally generated magnetic fields (from nearby electronics) and from nearby magnetic objects. Additionally, local earth magnetic fields must be mapped and available to the user. Gyroscopic sensors drift and must be re-calibrated regularly. Such limitations have hindered the use of these devices.

GNSS systems and techniques, including differential techniques, are now commonplace and as background are only briefly described herein. Signals from GNSS satellites contain information used by a GNSS receiver to determines a satellite's orbit, altitude, location and speed, and information that allows the GNSS receiver to determine its location on Earth and its distance from a satellite. If four satellites are sending data the position of the receiver can be calculated accurately. If fewer satellite signals are being received the receiver's position can be still be found or approximated.

Prior art measuring of phase differences of GNSS signals requires accurate measurements of the carrier phase measurements between antennas at known spacings. Such measurements are prone to errors due to multi-path effects even though there are antennas and algorithms to counter these effects. But, such antennas and algorithms are costly and typically block out low elevation satellites thus reducing the number of satellites used for the measurements.

Another limitation of prior art techniques using differential phase GNSS measurements is that long baselines (long times) are needed for accurate headings, but longer baselines make acquisition more difficult, and shorter baselines reduce accuracy. For example, a prior art 50 cm baseline may provide a one degree accuracy, whereas in a preferred embodiment of the present invention a 19 cm baseline provides a one degree accuracy—more than a 40% improvement.

Others have used GNSS phase differences, for example, U.S. Pat. No. 6,128,557 to Fenton et al., and which is commonly owned with the present invention, issued Oct. 3, 2000. This patent describes an invention that determines position and attitude of a rotating space vehicle using GNSS techniques. A phase discriminator measures phase differences that are used with signal strength, Doppler shifts to produce a "spin signature" that is used to calculate the space vehicle spin rates and attitude. Another U.S. patent, U.S. Pat. No. 6,018,315 to Ince et al., owned by Motorola, describes a system using differential measurements for attitude sensing. However, both of these inventions are subject to the limitations described above.

SUMMARY OF THE INVENTION

In view of the foregoing background discussion, the present invention provides for an array of antennas spacially separated in a known dimensioned pattern. A signal from a radiating source, preferably a satellite, is received and a null vector or angle with respect to the radiating source can be calculated therefrom. The calculations employ the known antenna pattern and the resulting null points to the radiating source. In order to determine the attitude of the antenna array with respect to the Earth's surface, a null vector to a second radiating source is found. The two nulls can be combined to yield the attitude or orientation of the antenna array to either one of the nulls. With respect to a satellite, knowing its actual location from the satellite's GNSS (or the equivalent) signals allows the attitude of the satellite with respect to the Earth's surface to be calculated. The difference between the measured attitude of the antenna array and the calculated attitude of the satellite will be the attitude of the array with respect to the Earth's surface.

Any apparatus, a ship, car, or airplane, etc., with a known geometric relationship to the antenna array and a known null angle and its known location (as typically found in a GNSS system) can then determine its location, heading and its pitch and roll by known calculations.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
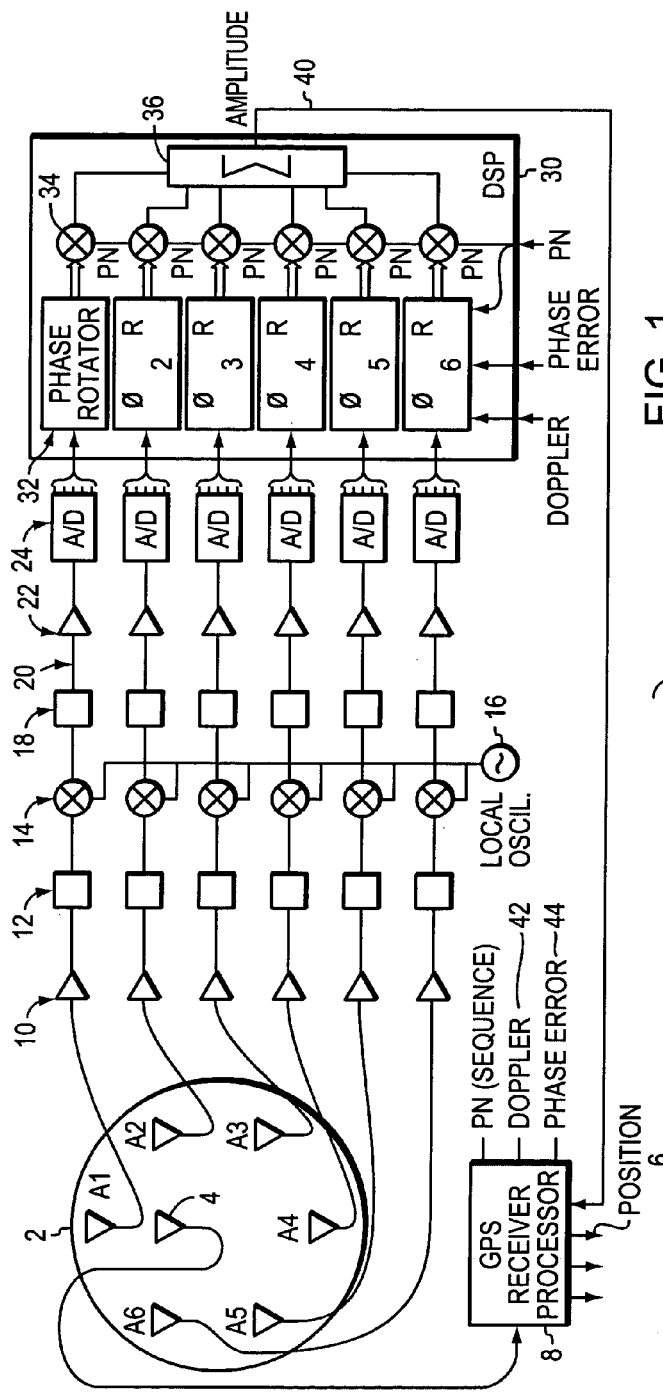
FIG. 1 is a system block diagram of a preferred embodiment of the present invention.

FIG. 1 is a block diagram schematic of a preferred electronic system and a seven antenna array 2 with a center antenna 4 that tracks all available GNSS satellites. GNSS systems are most familiar, but other satellite positioning systems may be used. A preferred antenna array is described in U.S. patent, mentioned above, U.S. Pat. No. 6,466,177 to Kunysz, which has been incorporated herein by reference. However, other arrays with fewer as antennas may be used to advantage as described below. In the seven antenna array, the center antenna tracks the array's position 6 on the Earth as commonly performed by the GNSS receiver 8.

Although this illustrative example discusses a satellite as a radiating source, other sources may be used to advantage within the present invention. Those other sources must have known locations, and may include television broadcasting towers, cell phone towers, or virtually any other tower based radiating source.

Still referring to FIG. 1, each antenna signal is amplified 10 (via a low noise amplifier), filtered 12, and frequency down converted by mixing with a local oscillator 16, then filtered 18 again to provide a clean lower intermediate frequency (IF) 20. The IF is amplified 22 and fed to analog to digital converters (A/D) 24. The same sample clock is used to sample the A/D outputs in the DSP 30. The DSP provides for a phase rotation by an different angle for each of the six now conditioned antenna signals, and means to remove the Doppler effect and the pseudo-random number (pn). The outputs are summed 36 periodically to track the null. The pseudo random number may be removed at earlier stages, at the rotator or, as shown, after phase rotation.

The six antennas, A1 to A6, are evenly distributed at sixty degrees ($\alpha$) around the center antenna 4. In this preferred embodiment, the six are used for determining the attitude of the array. Attitude is defined as the azimuth (horizontal direction) and elevation of a body with respect to some datum, say the Earth's surface. In preferred embodiments the antennas are laid out on a single printed circuit board (PCB) to retain repeatability and consistency. With respect to FIG. 1, it is important to keep the signal path lengths exactly the same, at least to within one millimeter (1 mm) up to the A/D converters 24.

Figure 2:
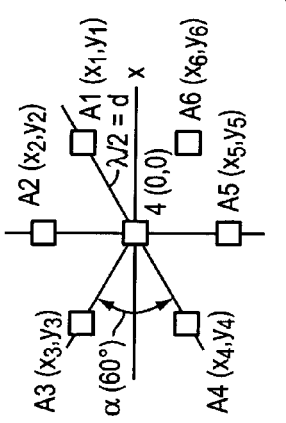
FIG. 2 is a block diagram of a preferred antenna array.

FIG. 2 is a view of the antenna array laid onto an x/y coordinate system with the center antenna at the origin (0,0). The following discussion and the two equations relate to FIG. 2 and a single selected satellite.

With respect to the GNSS system, the six antennas, A1 to A6, are arranged in a circle with a diameter (2d) of 19 cm. With this geometry, the length difference ($\Delta l$) to a satellite from the ith antenna in the array at an elevation $\theta$ with respect to the axes of the antennas and an azimuth $\phi$ is given by:

$$\Delta l_i = (dx)\sin\theta(x_i \cos\phi + y_i \sin\phi) \qquad \text{Eq. 1}$$

In order to create a null, if each antenna has a different phase added to its signal, the difference incrementing by the angle $\alpha$ (60 degrees) around the circle. The net sum can be made to be zero defining a null vector to the satellite.

This approach to finding a null is best applied to an even number of antennas, preferably four or more.

In more detail, the GNSS receiver 8 provides the Doppler signal and the measured clock error (phase) from the center antenna 4. The DSP removes the Doppler and carrier frequency from the conditioned signals from each of the six antennas. The DSP continues by separating the conditioned signals into in-phase and quadrature signals that are rotated in the phase rotator 32 for each of the six signals according to Eq. 2 as follows:

$$\beta_i = i(360/n) - (360/\lambda)\sin\theta(x_i \cos\phi + y_i \sin\phi); \qquad \text{Eq. 2}$$

where n is the number of antennas arranged evenly in a circle, and $\beta_i$ is in degrees.

Figure 3:
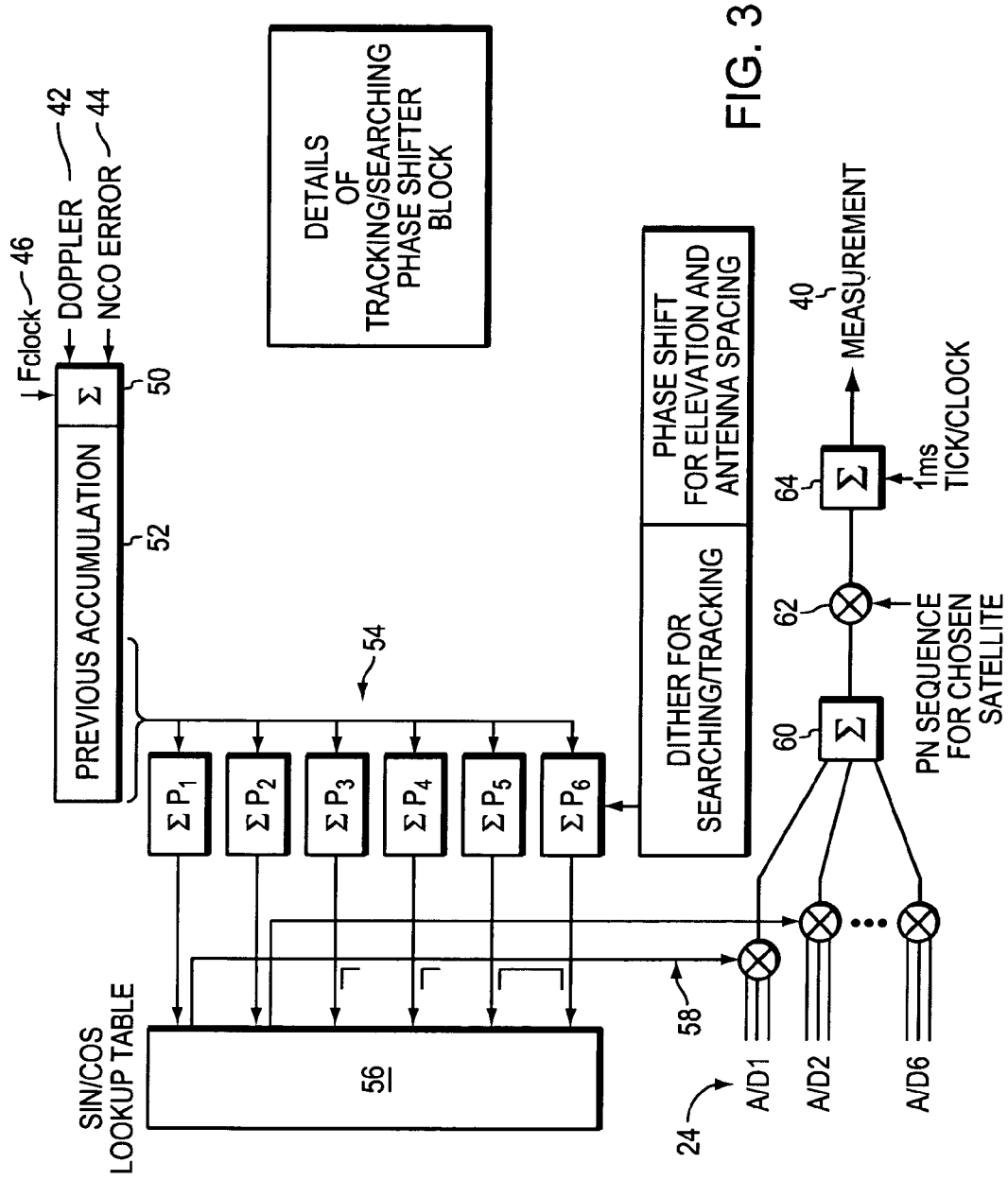
FIG. 3 is a block diagram/schematic of the phase shifting mechanism of a preferred embodiment of the invention.

FIG. 3 is a more detailed block diagram within the phase rotator blocks 32 in the DSP 30. The GNSS receiver 8 provides the Doppler signal 42 and the phase error 44 (for the center antenna 4) that are summed 50 and updated regularly, say every millisecond, by a clock Fclk. The phase accumulator 52 holds the up-to-date summed results of the phase error and the Doppler signal components for removal from the signals from the six antennas. The output of the phase accumulator 52 is fed via a sin/cos lookup table 56 to implement Equations 1 and 2. The output 58 of the lookup tables 56 are removed by combining with the A/D signal for each of the six antennas. The net effect is to rotate the in-phase (the sine) and quadrature (the cosine) components by the angle $\beta_i$. The signals are then summed 60, the pn for the selected satellite is removed 62 and the output measurement is presented updated every millisecond 64.

The output 40 is used by a tracking algorithm resident in a processor that may stand alone or be incorporated within the GNSS receiver. The algorithm works to change $\beta_i$ to set the output 40 to zero. When the output is at zero, the null is a vector pointing directly at the satellite. Since the satellite is at a known distance and attitude, the attitude of the satellite with respect to the antenna array is determined. But, since the array is omnidirectional, the array could rotate around that null vector as an axis and ambiguously maintain the same null vector. Therefore, the orientation of the array with respect to the Earth cannot be determined, with the exception where the axis of the circle antenna array is pointing directly at the satellite.

In such a case where the orientation of the array with respect to the Earth is required, a second satellite can be acquired and the null vector to that satellite determined. In this case, the vector to the second satellite will also define an ambiguous line, but the intersection of the ambiguous null lines can be used to define a single null vector to the first satellite or to the second satellite. In this case the orientation of the array with respect to the Earth's surface can be determined. Since the satellite is at a known distance and attitude, any difference between the measured null elevation angle and the GNSS calculated elevation angle ($\theta$) is the elevation angle of the antenna array with respect to the Earth's surface. Similarly, the difference between the measure azimuth angle and the GNSS calculated angle ($\alpha$) is the azimuth angle of the array with respect to the Earth's surface.

The second satellite is optimum if at ninety degrees from the first (the array being at the datum). The second cannot be at 180 degrees or the same problem will exist. This is easily checked by being sure that the null vector to the second satellite is not the negative null vector from the first satellite.

Essentially the system is solving for three variables in determining the orientation of the antenna array in the Earth's frame of reference, that is pitch, roll, and heading. Of course, the orientation may be determined with respect to any co-ordinate system. Each null direction to its radiating source, provides two measurements (azimuth and elevation angle with respect to the local reference system of the antenna array). When more than one null is used there are many ways of combining the measurements to solve for the three variables, substitution is the simplest, but not optimal technique, least squares techniques is another which is more optimal, as it attempts to find the best fit solution which minimizing the errors, but there are others which also may be suitable (or more so). All of these techniques are well known to those skilled in the art.

Figure 4:
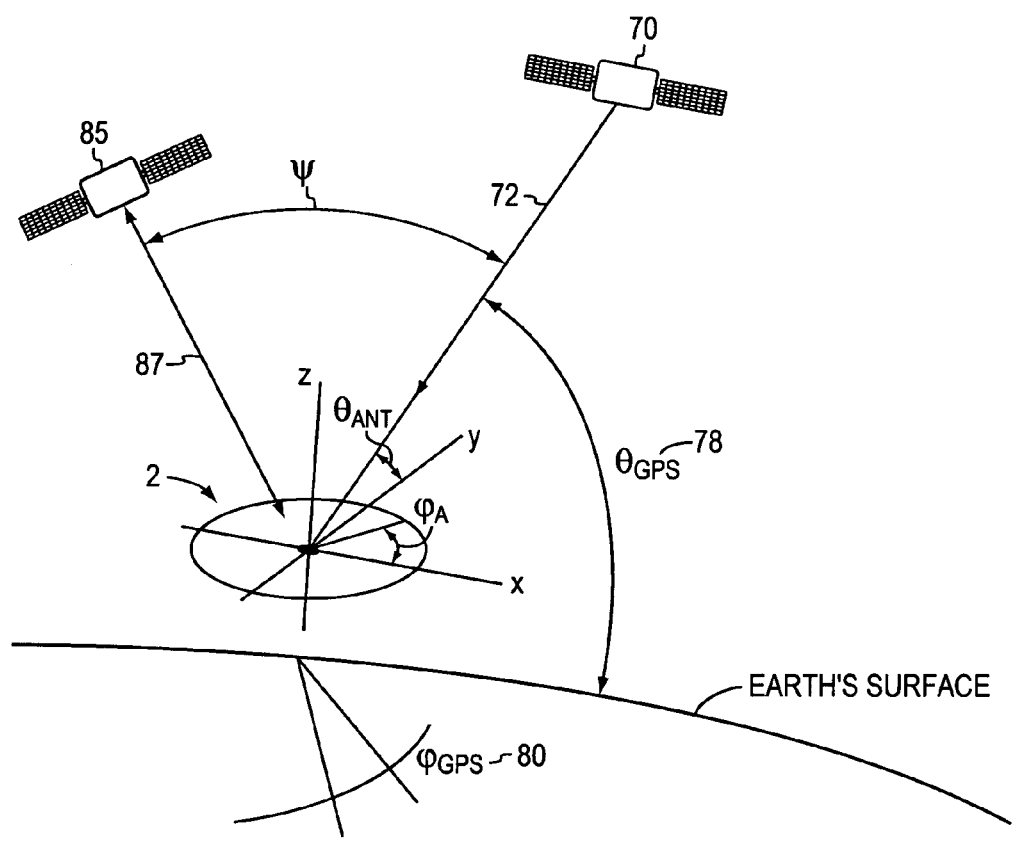
FIG. 4 is a pictorial of the antenna array relative to the Earth's surface.

FIG. 4 illustrates the discussion above. The antenna array 2 and the selected satellite 70 are shown relative to the Earth's surface. The $\theta$ and $\phi$ (elevation and azimuth) of the antenna relative to the satellite are found from the null determination discussed above. A second satellite 85 is selected and the null vector 87 measured for this satellite. In the case shown the angle $\Psi$ is about ninety degrees with respect from the first satellite vector 72. The difference between these angles relative to the antenna array and the same angles found from the GNSS signals are used to determine the orientation of the antenna array with respect to the Earth's surface. These differences are directly the pitch and roll, as known in the art.

FIG. 4 shows a selected satellite 70. Preferably, the selected satellite should be at least thirty degrees elevation above the horizon to avoid tall trees and buildings, and preferably less than seventy degrees to not foreshorten the satellite null vector projection onto the Earth's surface. However, satellites can be used well beyond the preferable elevation range.

Figure 5:
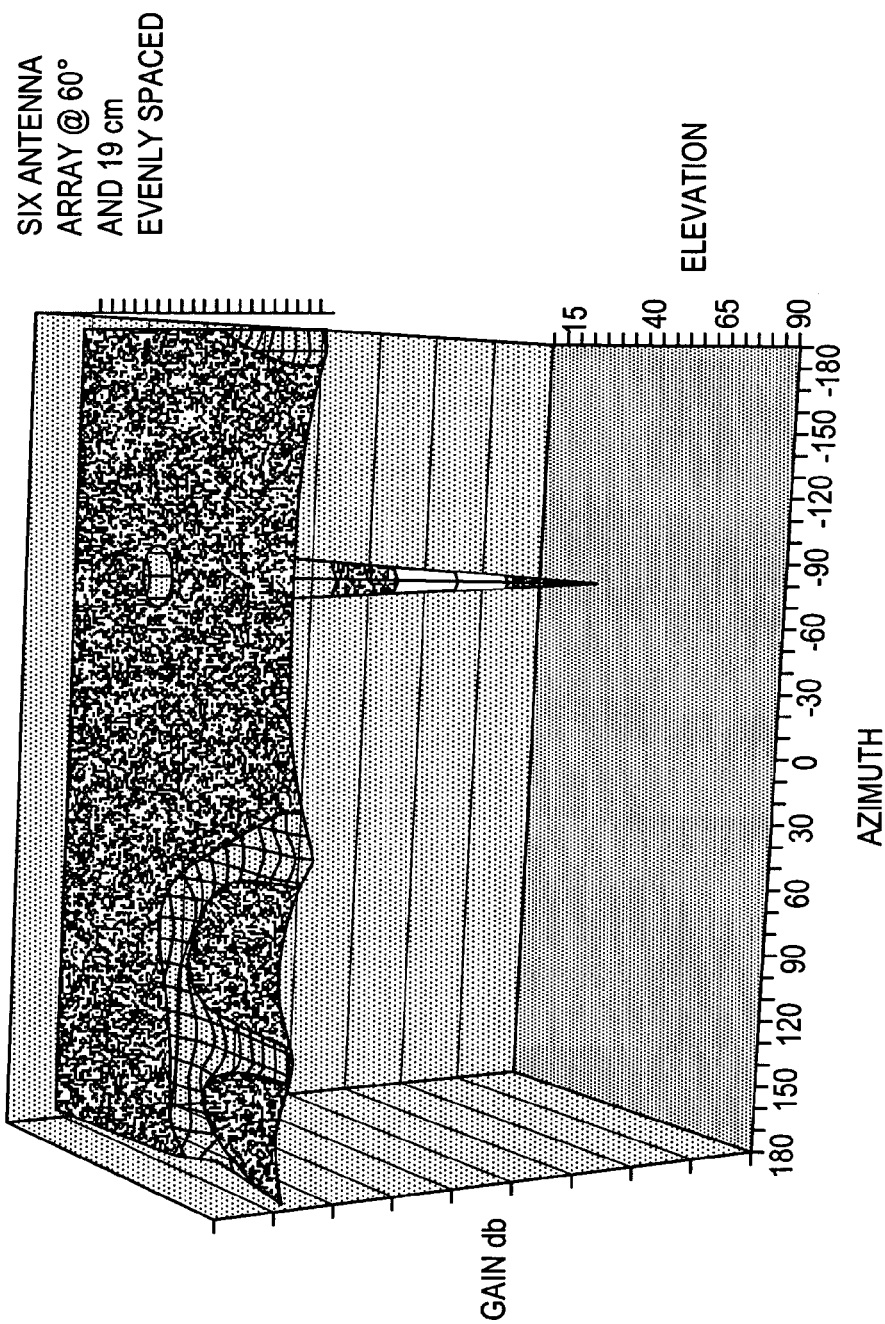
FIG. 5 is a contour plot showing a null from signals received by a six antenna array.

FIG. 5 shows a contour plot of a preferred seven antenna array as shown in FIG. 2. The six antennas yield a very well defined null. However, the null will not result in a point when noise is involved. In the face of noise the null will be a range or surface in the azimuth and elevation dimensions. In such cases a more precise null can be found by "dithering." As known, calculations are performed every millisecond or so, and by moving a small angle amount (δ) both plus and minus in the azimuth and the elevation dimensions away from a null, and iteratively calculating the resulting amplitude 40 from the summer 36, the noise will tend to cancel and a better null calculated. Such noise canceling operations are well known.

In order to search and acquire a satellite and its signal, the unit could first accumulate the phase of each antenna channel separately from any GNSS signal received. This value could be used to generate a null for a given satellite. The null could be generated for a number of other satellites and one selected that provides reasonable elevation and low noise. In any event there may be many ad hoc factors known to practitioners in the art used to find and select a satellite.

Also, the antennas and the electronics must be normalized or balanced so that the same signal with a given signal strength received at each antenna yields the same digital values, usually within the least significant bit. By careful design of the antennas on a PCB with care given to equalize the physical dimensions of each antenna and the signal path lengths, the antennas can be closely matched within acceptable tolerances to provide better than one degree accuracy. In the development stage a radiated signal carried out in an anechoic chamber would be used to ensure an acceptable antenna PCB layout. In such a case, the down converters and filter stages would need to be calibrated. A single signal, split into seven equal paths and a high impedance coupler into the low noise amplifiers (FIG. 1, items 10) could be used to calibrate each of the seven signal paths through to the A/D converters. A correction factor or a correction function could be developed for each antenna.

Another approach would be to radiate from each antenna (within the RF band designed for) a signal pickup by the other antennas. The signal would be coded as is a GNSS signal and phase balancing would be applied so that physical spacings, path lengths and electronics could be measured and a correction factor determined. In such an instance each of the seven antennas would be used to radiate a signal and the other six used as receivers. So, forty two measurements would provide a very accurate picture of the antenna array.

Performing such calibration, normalization or balancing is known to those skilled in the art. In addition other such techniques will be known to those skilled in the art.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. An apparatus for determining attitude comprising:
   an antenna array arranged to receive signals from radiating sources outputting coded signals, where the antennas in the array are spacially arranged in a known pattern;
   means for measuring the phase of the radiating sources' signals received at each antenna;
   means for determining the position of the array;
   means for determining the position of a first radiating source,
   means for combining the measured phase signals from the antennas and the pattern of the antennas to create a first null, wherein the first null points at the first radiating source, and wherein the direction of the first null is the attitude of the first radiating source relative to the antenna array,
   means for calculating the attitude of a second radiating source from its signals;
   means for measuring the phase of signals from the second radiating source;
   means for combining the measured phase signals to create a second null that points to the second radiating source;
   means for determining the position of the second radiating source, and;
   means for combining the directions of the two nulls to determine the antenna array's orientation either in an Earth based or other co-ordinate system.

2. The apparatus of claim 1 wherein the first and the second radiating sources are GNSS broadcasting satellites, and wherein the antenna array receives signals from, and tracks all, viewable satellites, and further wherein a null is determined for each viewable satellite, wherein the location on Earth and the orientation, the pitch and roll, of the antenna array is determined using all the nulls.

3. The apparatus of claim 2 wherein the location on Earth and the antenna array's orientation, the pitch and roll, is determined using a least squares method applied to the nulls for all the viewable satellites.

4. The apparatus of claim 1 wherein the first radiating source is a satellite, and further comprising another antenna, wherein this antenna tracks all viewable satellites.

5. The apparatus of claim 4 wherein the null and the calculated attitude from the satellite system are periodically updated.

6. The apparatus of claim 4 wherein the means for combining comprises:
   means for compensating for the Doppler effect, for phase error, and for the pseudo random signal found in the received signals.

7. The apparatus of claim 4 wherein the means for combining includes means for breaking the signals into in-phase and quadrature components, and a look up table for performing the combining.

8. The apparatus of claim 4 further comprising:
   means for first selecting an optimum pair of radiators which are about 90 degrees to each other with respect to the array, wherein the elevation of each of the radiators is high enough to minimize multipath transmissions to the array.

9. The apparatus of claim 4 wherein the satellite system is the GNSS system.

10. The apparatus of claim 1 further comprising:
    means for radiating a coded signal from each antenna in sequence in the array wherein the signal is received by all the other antennas and, from the received signals;
    means for measuring each received signal; and
    means for generating a calibration factor for each antenna and its related signal path.

11. An apparatus for determining attitude comprising:
    an antenna array arranged to receive signals from a first radiating source, where the antennas in the array are spacially arranged in a known pattern;
    means for measuring the phase of the first radiating source's signals received at each antenna;

means for combining the measured phase signals from the antennas and the pattern of the antennas to create a first null, wherein the first null points at a first radiating source, and wherein the direction of the first null is the attitude of the first radiating source relative to the antenna array;

means for calculating the attitude of the first radiating source from its signals;

means for measuring the phase of signals from a second radiating source;

means for combining the measured phase signals to create a second null that points to the second radiating source;

means for combining the first and second nulls to determine the antenna array's orientation on the surface of the Earth with respect to an Earth based or other co-ordinate system.

12. The apparatus of claim 11 wherein the first and the second radiating sources are GNSS broadcasting satellites, and wherein the antenna array receives signals from, and tracks all, viewable satellites, and further wherein a null is determined for each satellite, wherein the location on Earth and the orientation, the pitch and roll, of the antenna array is determined using all the nulls.

13. A process for determining attitude comprising:

arranging an antenna array to receive signals from radiating sources outputting a coded signal, where the antennas are spacially arranged in a known pattern;

measuring the phase of the radiating sources' signals received at each antenna;

determining the position of the array, determining the position of a first radiating source, combining the measured phase signals from the antennas and the pattern of the antenna array to create a first null, wherein the first null points at the first radiating source, and wherein the direction of the first null is the attitude of the first radiating source relative to the antenna array, calculating the attitude of the first radiating source from its signals;

measuring the phase of signals from a second radiating source;

combining the measured phase signals to create a second null that points to the second radiating source;

determining the position of the second radiating source, and;

combining the directions of the two nulls to determine the antenna array's orientation either in an Earth based or other co-ordinate system.

14. The process of claim 13 wherein the first and the second radiating sources are GNSS broadcasting satellites, and wherein the antenna array receives signals from, andtracks all, viewable satellites, and further wherein a null is determined for each satellite, wherein the location on Earth and the orientation, the pitch and roll, of the antenna array is determined using a least squares method applied to the null directions for all the viewable satellites.

15. The process of claim 13 further comprising the step of providing another antenna, wherein this antenna tracks all viewable satellites.

16. The process of claim 13 further comprising the step of periodically updating the measured null and the calculated attitude from the first radiating source.

17. The process of claim 13 wherein the step of combining further comprises the step of compensating for the Doppler effect, for phase error, and for the pseudo random signal found in the received first radiating source's signals.

18. The process of claim 13 further wherein the step of combining further comprises the steps of:

breaking the radiated signals into in-phase and quadrature components, and performing calculations using a look up table.

19. The process of claim 13 further comprising the steps of:

selecting a pair of radiators which are about 90 degrees to each other with respect to the array, and second selecting the optimum pair wherein the elevation of each of the radiators is high enough to minimize multi-path transmissions to the array.

20. The process of claim 19 wherein the pair of radiating sources are selected from the GNSS system satellites.

* * * * *